Aug. 31, 1954    A. B. LARSON    2,687,571
SCRAPER
Filed March 7, 1952
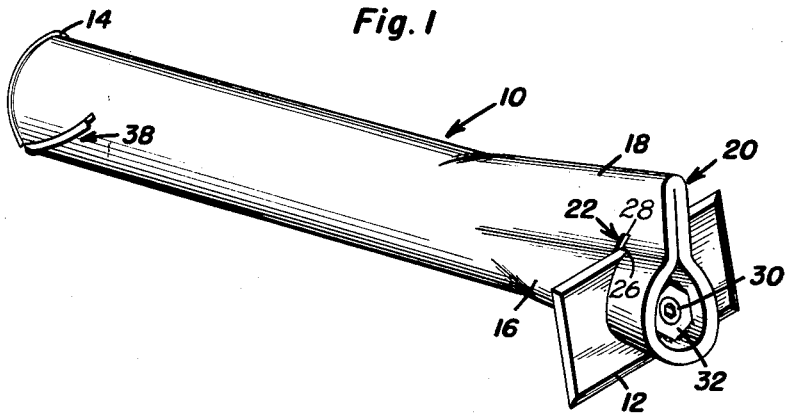
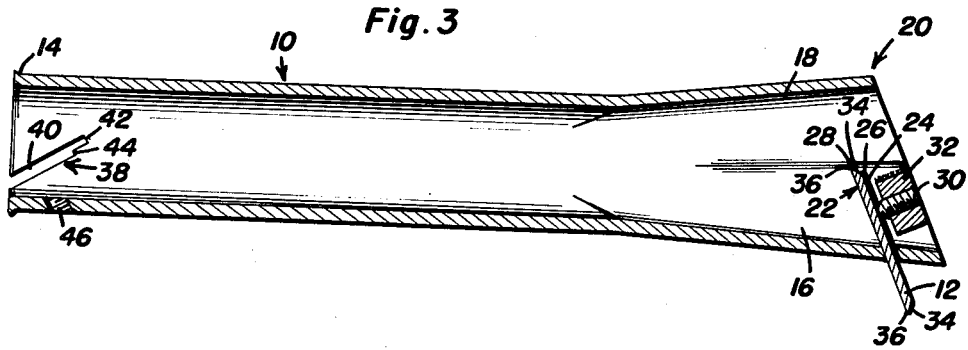
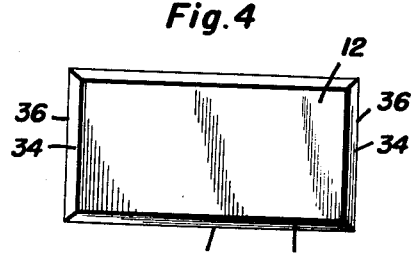
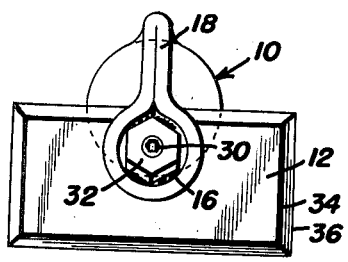
Andrew B. Larson
INVENTOR.
BY *Clarence A. O'Brien
and Harvey B. Jacobson*
Attorneys Patented Aug. 31, 1954

2,687,571

UNITED STATES PATENT OFFICE 2,687,571

SCRAPER

Andrew B. Larson, Moline, Ill.

Application March 7, 1952, Serial No. 275,427

1 Claim. (Cl. 30—171)

This invention relates in general to scrapers, and more particularly to hand scrapers adapted for hand scraping in any desired application such as, for instance, the scraping of wood, paint, varnish, etc.

The primary object of this invention is to provide an improved hand scraper having means for releasably clamping a scraper blade and at the same time rigidly holding said blade with respect to the handle of the scraper.

Another object of this invention is to provide an improved handle for a hand scraper, said handle having a reinforced end portion formed at one end thereof, said reinforced end portion having a scraper blade receiving slot therein and screw means for firmly retaining a scraper blade within said slot.

Another object of this invention is to provide an improved scraper blade handle having a blade receiving slot therein, said blade receiving slot having a transverse shoulder adjacent the upper end thereof to form a reduced upper portion, said transverse shoulder being adapted to engage the edge surface of said blade and permit the sharpened cutting edge to be received within the reduced upper portion and free of contact with the upper end of the blade-receiving slot, whereby a scraper blade associated therewith may be sharpened on all edges thereof.

A further object of this invention is to provide an improved scraper which is reversible and has blade-receiving slots at each end thereof, the blade-receiving slots being disposed at different angles through the longitudinal axis of the handle whereby different blade positions may be readily obtained.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a perspective view of the improved hand scraper which is the subject of this invention, the handle of the scraper having a scraper blade associated with one blade-receiving slot thereof;

Figure 2 is an enlarged end elevational view of the hand scraper of Figure 1 looking at the end of the hand scraper in which the scraper blade is disposed;

Figure 3 is an enlarged longitudinal vertical sectional view taken substantially on a vertical plane passing through the longitudinal axis of the scraper of Figure 1 and showing the general construction thereof; and Figure 4 is an enlarged plan view of the scraper blade mounted in the scraper handle, the blade being provided with a sharpened edge along each edge surface thereof.

Similar characters of reference designate similar or identical elements and portions throughout the specification and throughout the different views of the drawings.

Referring now to the drawings in detail, it will be seen that the hand scraper which is the subject of this invention includes a handle which is referred to in general by the reference numeral 10 and a replaceable scraper blade 12. The handle 10 is formed of an elongated section of tubing and has one end thereof flared as at 14. The other end of the handle 10 has the upper half longitudinally crimped adjacent that end thereof to form a tubular part 16 of reduced diameter having an integral reinforcing rib 18. It will be noted that either the flared end 14 or the crimped end will provide satisfactory hand grip portions.

In order that the scraper blade 12 may be conveniently associated with the handle 10, the crimped end portion, which is referred to in general by the reference numeral 20, is provided with a transverse blade-receiving slot 22 extending through the tubular part 16. The blade-receiving slot 22 includes a wide lower portion 24 having an upper shoulder 26 separating same from a reduced upper slot portion 28. When the scraper blade 12 is disposed within the blade receiving slot 22, it is clamped therein by a set screw 30 which may be of the Allen set screw type. The set screw 30 is threadingly engaged within a nut 32 welded in the end of the tubular part 16 with its longitudinal axis normal to the plane of the blade-receiving slot 22. In order that the proper scraping angle may be obtained in close quarters, the crimped end portion 20 is cut off at an angle to the transverse axis of the handle 10 and in spaced parallel relation to the plane of the slot 22.

Referring now to Figure 4 in particular, it will be seen that the blade 12 is generally rectangular in outline and has outer edges 34 bevelled so as to provide sharp cutting edges 36 at each edge thereof. While the scraper blade 12 has been illustrated and described as being generally rectangular in outline, it will be understood that the blade may be of any configuration and, if desired, may have a special curved contour for scraping molding, etc.

Referring now to Figure 3 in particular, it will be seen that when the scraper blade 12 is disposed in the scraper blade receiving slot 22 at the crimped end 20 of the handle 10 the bevelled edge 34 thereof disposed at the upper end engages the shoulder 26 of the blade-receiving slot 22 and prevents the cutting edge 36 from striking the upper extremity of the reduced upper slot portion 28. Due to this novel arrangement, the scraper blade 12 may be disposed within the blade-receiving slot 22 in any desired position without endangering the sharpness of the cutting edges 36 disposed within the blade-receiving slot 22. The blade 12 is maintained within the blade-receiving slot 22 by tightly screwing down the set screw 30 into engagement with the face of the scraper blade 12.

The scraper handle 10 is of the reversible type and has a second blade-receiving slot 38 in the flared end thereof. The blade-receiving slot 38 is at a different angle to the transverse axis of the handle 10 than is the blade-receiving slot 22 and opens through the crimped end of the handle 10. The blade-receiving slot 38 is similar to the blade-receiving slot 22 in that it has an enlarged outer slot portion 40 separated from a reduced inner slot portion 42 by a shoulder 44 which is adapted to engage one of the bevelled edge surfaces 34 of the scraper blade 12.

In order that the scraper blade 12 may be conveniently clamped within the blade-receiving slot 38, the side wall of the handle 10 is provided with a threaded bore 46 in general alignment with the blade-receiving slot 38 and having a longitudinal axis normal to the plane of the blade-receiving slot 38. The threaded bore 46 is adapted to receive a set screw (not shown) similar to the set screw 30 and releasably clamp either the scraper blade 12 or a similar scraper blade (not shown) within the blade-receiving slot 38. Inasmuch as a scraper blade is clamped within only one end of the handle 10 at a time, it is obvious that the set screw 30 may be utilized in combination with a threaded bore 46 if it is so desired.

It will be understood that the tubing forming the handle 10 may be conventional piping of a diameter suitable to the hand of a person utilizing the scraper and that the nut 32 and its associated set screw 30 are conventional fastener elements whereby the entire scraper assembly may be formed of readily obtainable materials. By forming a second slot in the opposite end of the handle 10 from the first slot, it is obvious that due to the difference in angles between the two slots that the scraper has dual utility.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention as defined in the appended claim.

Having described the invention, what is claimed as new is:

A scraper comprising an elongated tubular handle having a longitudinally crimped end portion including a tubular part of reduced diameter and an integral reinforcing rib, said tubular part being provided with a transversely extending scraper blade-receiving slot, a blade disposed within said blade receiving slot, retaining means within said tubular part cooperating with said blade-receiving slot to retain said scraper blade therein, said blade having its outer edge surface beveled and terminating in a sharpened edge, said slot having a reduced upper portion and including a transverse shoulder adjacent the upper end of the main slot portion, said shoulder being selectively engaged with said beveled edge surface of said blade and positioning said sharpened edge thereof in isolated relation within said upper slot portion, the upper end of said main slot portion being spaced from said shoulder a distance to clear said sharpened edge.

References Cited in the file of this patent
UNITED STATES PATENTS

| Number | Name | Date |
| --- | --- | --- |
| 465,825 | Atwood | Dec. 29, 1891 |
| 785,556 | Kent | Mar. 21, 1905 |
| 1,531,137 | Ruff | Mar. 24, 1925 |
| 1,943,252 | Abrahamsen | Jan. 9, 1934 |
| 1,985,537 | Egan | Dec. 25, 1934 |